United States Patent
Creighton et al.

(10) Patent No.: US 12,163,085 B2
(45) Date of Patent: Dec. 10, 2024

(54) COMPOSITIONS COMPRISING WATER DISPERSIBLE POLYMER AND UNSATURATED DICARBOXYLIC ACID DERIVATIVE SUITABLE FOR ENHANCING CHAR

(71) Applicant: 3M INNOVATIVE PROPERTIES COMPANY, St. Paul, MN (US)

(72) Inventors: Megan A. Creighton, Somerville, MA (US); Nathan E. Schultz, Woodbury, MN (US); Tien Tsung Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 608 days.

(21) Appl. No.: 17/429,386

(22) PCT Filed: Mar. 18, 2020

(86) PCT No.: PCT/IB2020/052463
§ 371 (c)(1),
(2) Date: Aug. 9, 2021

(87) PCT Pub. No.: WO2020/194130
PCT Pub. Date: Oct. 1, 2020

(65) Prior Publication Data
US 2023/0357640 A1 Nov. 9, 2023

Related U.S. Application Data

(60) Provisional application No. 62/823,953, filed on Mar. 26, 2019.

(51) Int. Cl.
| | |
|---|---|
| *C09K 21/14* | (2006.01) |
| *C08H 7/00* | (2011.01) |
| *C08K 5/3415* | (2006.01) |
| *C08L 97/00* | (2006.01) |
| *C09K 21/10* | (2006.01) |

(52) U.S. Cl.
CPC ............... *C09K 21/14* (2013.01); *C08H 6/00* (2013.01); *C08K 5/3415* (2013.01); *C08L 97/005* (2013.01); *C09K 21/10* (2013.01); *C08L 2201/02* (2013.01)

(58) Field of Classification Search
None
See application file for complete search history.

(56) References Cited

U.S. PATENT DOCUMENTS

| | | | |
|---|---|---|---|
| 3,915,911 A | 10/1975 | Horiguchi | |
| 4,154,737 A * | 5/1979 | Orphanides | C07D 207/452 |
| | | | 548/522 |
| 2014/0037867 A1 | 2/2014 | Wheatley | |
| 2014/0235132 A1 | 8/2014 | Brizius | |
| 2017/0182341 A1* | 6/2017 | Libal | A62D 1/005 |

FOREIGN PATENT DOCUMENTS

| | | |
|---|---|---|
| CN | 1465646 | 1/2004 |
| CN | 101831192 | 9/2010 |
| CN | 101851429 | 10/2010 |
| CN | 102516785 | 6/2012 |
| CN | 103275354 | 9/2013 |
| CN | 104194371 | 12/2014 |
| CN | 104371116 | 2/2015 |
| CN | 104927267 | 9/2015 |
| CN | 104987637 | 10/2015 |
| CN | 106220861 | 12/2016 |
| CN | 107502145 | 12/2017 |
| CN | 108117709 | 6/2018 |
| CN | 109503860 | 3/2019 |
| JP | 04028723 | 1/1992 |
| WO | WO 2018-032079 | 2/2018 |

OTHER PUBLICATIONS

Buono, "Thermally healable and remendable lignin-based materials through Diels—Alder click polymerization", Polymer, Dec. 2017, vol. 133, pp. 78-88, XP55703729A.
Duval, "Reversible crosslinking of lignin via the furan-maleimide Diels-Alder reaction", Green Chemistry, 2015, vol. 17, pp. 4991-5000.
Gilman, "Thermal Decomposition Chemistry of Poly(vinyl alcohol)", IN. Fire and Polymers II. Materials and Test for Hazard Prevention, American Chemical Society, ACS Symposium Series 599, Aug. 21-26, 1994, Washington, DC, pp. 161-185, XP55097993A.
International Search Report for PCT International Application No. PCT/IB2020/052463, mailed on Jun. 23, 2020, 5 pages.

* cited by examiner

*Primary Examiner* — Robert T Butcher
(74) *Attorney, Agent, or Firm* — Carolyn A. Fischer

(57) ABSTRACT

A flame-retardant composition is described comprising a mixture of a water dispersible organic polymer; and a water dispersible derivative of an unsaturated dicarboxylic acid or anhydride thereof. The water dispersible derivative typically has a solubility in a 0.1 N aqueous solution of NaOH at 25° C. of at least 25 g/liter. Also described is a flame-retardant composition comprising the mixture described dispersed in an aqueous carrier and method of making a flame-retardant composition.

11 Claims, 3 Drawing Sheets

COMPOSITIONS COMPRISING WATER DISPERSIBLE POLYMER AND UNSATURATED DICARBOXYLIC ACID DERIVATIVE SUITABLE FOR ENHANCING CHAR

SUMMARY

In one embodiment, a flame-retardant composition is described comprising a mixture of a water dispersible organic polymer; and a water dispersible derivative of an unsaturated dicarboxylic acid or anhydride thereof. The water dispersible derivative typically has a solubility in a 0.1 N aqueous solution of NaOH at 25° C. of at least 25 g/liter.

In some embodiments, the water dispersible derivative comprises an unsaturated cycloaliphatic group. In some embodiments, the water dispersible derivative is a reaction product of lignin and an unsaturated dicarboxylic acid or anhydride thereof.

In some embodiments, the water dispersible derivative is a reaction product of maleic anhydride and a polyamine. In some embodiments, the water dispersible derivative comprises ring-opened maleimide moieties.

In typical embodiments, upon thermal decomposition of the mixture of water dispersible polymer and water dispersible derivative a char forms and the char yield is 90% or greater of the theoretical char yield.

In favored embodiments, upon thermal decomposition of the mixture of water dispersible polymer and water dispersible derivative of an unsaturated dicarboxylic acid or anhydride thereof, a char forms of increased strength in comparison to the water dispersible polymer alone.

Also described is a flame-retardant composition comprising the mixture described dispersed in an aqueous carrier.

Also described is a method of making a flame-retardant composition comprising dispersing the mixture described herein in an aqueous carrier.

DETAILED DESCRIPTION

Figure 1:
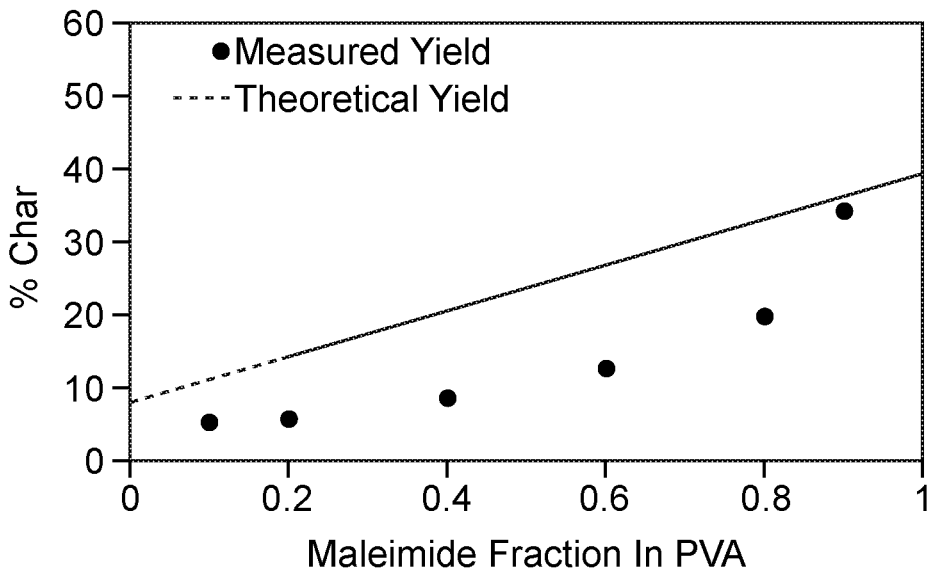
FIG. 1 is the % char of polyvinyl alcohol (PVA) comprising a comparative maleimide compound.

The flame-retardant composition described herein comprises a water dispersible polymer.

In one embodiment, the water dispersible polymer comprises polyethylene glycol (PEG) also known as polyethylene oxide (PEO). The structure of PEG is commonly expressed as H—(O—$CH_2$—$CH_2$)$_n$—OH.

PEO is water dispersible in view of the high ratio of oxygen atoms to carbon atoms (about 1:2; wherein n is larger). However, the ratio of hydroxyl groups to carbon atoms is quite low.

Rapid thermal degradation of polyethylene glycols under nitrogen typically happens at temperatures above 300° C. In air, rapid degradation may begin at temperatures below 250° C.

In another embodiment, the water dispersible polymer may be characterized as a water soluble synthetic polymer, such as in the case of poly(vinyl alcohol) (PVOH, PVA). PVA is composed mainly of 1,3-diol linkages [—$CH_2$—CH(OH)—$CH_2$—CH(OH)—] but a few percent of 1,2-diols [—$CH_2$—CH(OH)—CH(OH)—$CH_2$—]. The generic formula of PVA is typically represented as [$CH_2$CH(OH)]$_n$.

In some embodiments, the water dispersible or water-soluble polymer (e.g. PVA) has a high ratio of hydroxyl groups to carbon atoms ranging from 1:5 to 1:2. In some embodiment, the ratio of hydroxyl group to carbon atoms is at least 1:4, 1:3, or 1:2.

PVA has a melting point of 230° C. and 180-190° C. (356-374 degrees Fahrenheit) for the fully hydrolyzed and partially hydrolyzed grades, respectively. It decomposes rapidly above 200° C. as it can undergo pyrolysis at high temperatures.

The PVA of the flame-retardant composition described herein is typically at least 50% hydrolyzed and in some embodiments at least 60, 65, 70, 75, 80, 85, 90, or 95 hydrolyzed. For example, the PVA may be characterized as 87-88% hydrolyzed or 98-99% hydrolyzed.

Combinations of at least two water dispersible polymers can be employed in the flame-retardant composition described herein.

The total amount of water dispersible polymer in the mixture can vary. In typical embodiments; the concentration of water dispersible polymer is at least 5, 10, 15 or 20 wt. % solids (i.e. excluding the liquid aqueous carrier) of the flame-retardant composition. In some embodiments, the concentration of water dispersible polymer is at least 25, 30, 35, 40, 45, 50, 55, 60, 65, 70, 75, 80, 85, 90, or 95 wt. % solids of the flame-retardant composition. In some embodiments, the concentration of water dispersible polymer is no greater than 95, 90, 85, 80, 75, 70, 65, 60, 55, 50, 45, 40, 35, 30, or 25 wt. % solids of the flame-retardant composition.

In some embodiments, the amount of water dispersible polymer is less than or equal to the amount of char enhancing water dispersible derivative. In this embodiment, the amount of water dispersible polymer is no greater than 50, 45, or 40 wt. % solids. In other embodiments, the amount of water dispersible polymer is greater than the amount of water dispersible derivative. In this embodiment, the amount of water dispersible polymer is typically at least 55, 60, or 65 wt. % solids.

Maleimide is a chemical compound with the formula $H_2C_2(CO)_2NH$. Maleimide and its derivative are prepared from maleic anhydride by reaction with amines followed by dehydration. Thus, maleimide can be characterized as a derivative of a (e.g. maleic) unsaturated dicarboxylic acid derivative or anhydride thereof.

The thermal decomposition of PVA alone and in the presence of certain maleimides such as N,N'-(1,4-phenylene)dimaleimide and N,N'-(1,3-phenylene)dimaleimide has been described in the literature. (See for example Gilman, Jeffrey W, et al. "Thermal Decomposition Chemistry of Poly(vinyl alcohol)." *Fire and Polymers II: Materials and Test for Hazard Prevention*, American Chemical Society, pp. 161-185. ACS Symposium Series 599. According to this reference, PVA forms conjugated dienes during thermal decomposition.

Such maleimide compounds have been described as being insoluble in water. Due to the insolubility in water, it is difficult to attain a good mixture with water dispersible (e.g. soluble) polymers, such as PVA. However, it has been found that other derivatives of an unsaturated dicarboxylic acid or anhydride thereof can be utilized as water dispersible (e.g. char enhancing) materials in combination with water dispersible polymers.

In one embodiment, the water dispersible (e.g. char enhancing) derivative is a reaction product of an unsaturated dicarboxylic acid or anhydride thereof and lignin.

Lignin is a class of complex organic polymers that form key structural materials in the support tissues of vascular plants and some algae. Lignins are particularly important in the formation of cell walls, especially wood and bark, because they lend rigidity and do not rot easily. Chemically, lignins are cross-linked phenolic polymers.

The lignols that crosslink are of three main types, all derived from phenylpropane: 4-hydroxy-3-methoxyphenyl-propane, 3,5-dimethoxy-4-hydroxyphenylpropane, and 4-hydroxyphenylpropane (depicted as follows).

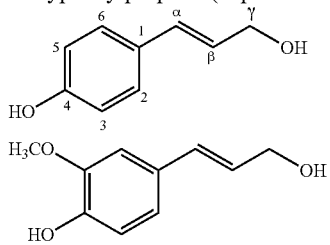

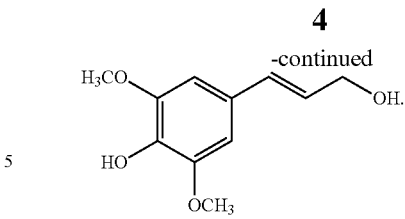

The composition of lignin varies from species to species. For example, 4-hydroxyphenylpropane is more prevalent in hardwoods and the other types with methoxy substituents more prevalent in conifers.

Lignin includes hydroxyl groups attached directly to an aliphatic or aromatic ring. Lignin also contains —CH$_2$OH groups, or in other words primary alcohol groups. Lignin also contains other types of alcohol groups that may be categorized as secondary alcohol groups, having the formula "—CHROH" or tertiary alcohol groups having the formula "—CR$_2$OH", where "R" indicates a carbon-containing group.

Various structures of lignin have been described in the literature. One representative structure is as follows:

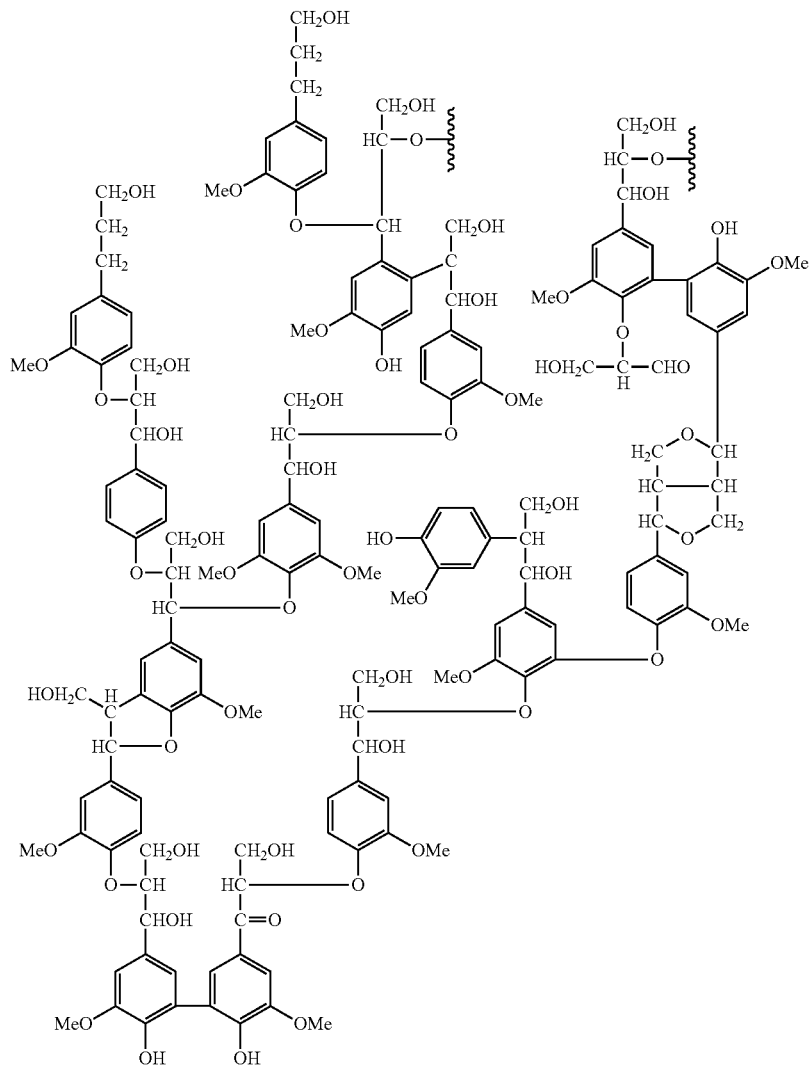

When lignin is removed from wood by sulfite pulping, the lignin may be characterized as sulfonated lignin. Sulfonation occurs at the side chains. Thus, the lignin structure comprises —$SO_3^-M$ groups in place hydroxyl atoms on the (e.g. propyl) side chains, wherein M is a metal such as sodium.

Sulfonated lignin is also known as lignosulfonate and more commonly kraft lignin.

Lignin and lignosulfonate can have various molecular weights. The molecular weight can range from 1000 to 140,000 daltons. Lignin and lignosulfonate are both water dispersible and are described in the literature as being water soluble.

The lignin and lignosulfonate both comprise various reactive sites, particularly hydroxyl and/or sulfonate groups. These reactive sites can react with and covalently bond to a compound comprising a coreactive group and at least one unsaturated dicarboxylic acid or anhydride thereof One representative compound comprising a coreactive group and a maleimide group is 6-malimidohexanyl chloride.

Upon reaction with kraft lignin, the —$SO_3^-M$ groups react with the chloride forming —$SO_3$-L-M' wherein L is a (e.g. C2-C12 alkylene) divalent linking group and M' is a maleimide group. Thus, the lignin derivative comprises a plurality of groups comprising an unsaturated dicarboxylic acid moiety or anhydride. Unsaturated dicarboxylic acids and anhydrides thereof, such as maleimides, are susceptible to addition reactions across the double bond such as by Diels-Alde reactions. Without intending to be bound by theory, this reaction mechanism is believed to crosslink the char, thereby improving its strength.

The lignin or lignosulfonate are water dispersible and described in the literature as being water soluble. The lignin or lignosulfonate further comprising covalently bonded unsaturated dicarboxylic acid or anhydride moieties is also water dispersible/soluble.

As used herein, water dispersible refers to the maleic anhydride derivative being dispersible or soluble in a 0.1 N aqueous solution of NaOH (at 25° C.) at a concentration of at least 25 g/liter. When the maleic anhydride derivative is water dispersible, it remains dispersed for at least 24 hours.

In another embodiment, the water dispersible (e.g. char enhancing) derivative is prepared from reaction of an unsaturated dicarboxylic acid derivative or anhydride thereof (e.g. maleic anhydride) with a polyamine (e.g. diamine).

In some embodiments, the water dispersible derivative has the general formula

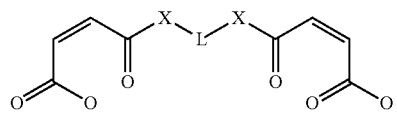

wherein X is oxygen or nitrogen; and

L is a divalent linking group comprising an aromatic moiety.

In some embodiments, L is aryl (e.g. phenyl) or —($CH_2$)n-Aryl-($CH_2$)n- wherein n typically ranges from 1-6. In some embodiments, n is no greater than 5, 4, 3, or 2.

One representative reaction scheme of diamino-p-xylene with maleic anhydride is depicted as follows:

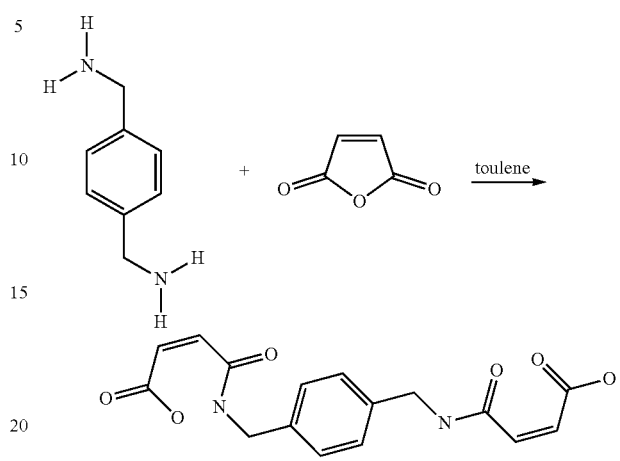

In some embodiments, such as depicted by the compound just described, the unsaturated dicarboxylic acid (e.g. maleic anhydride) derivative may be characterized as having ring-opened maleimide moieties.

Other unsaturated dicarboxylic acid derivative or anhydride thereof that can be reacted with a polyamine include for example maleic acid (cis isomer of butenedioic acid) and fumaric acid (trans isomer of butenedioic acid), depicted below:

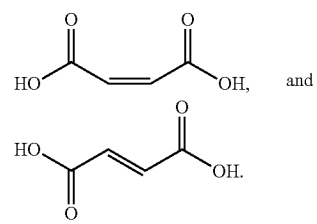

The polyamine (e.g. diamine) is typically an aromatic polyamine comprising at least one aromatic ring. Other suitable aromatic diamines include ortho, meta, or para phenylene diamine.

Combinations of at least two water dispersible derivatives of an unsaturated dicarboxylic acid or anhydride thereof can be employed in the flame-retardant composition described herein.

The total amount of water dispersible derivative of an unsaturated dicarboxylic acid or anhydride thereof in the mixture can vary. In typical embodiments, the concentration of water dispersible derivative is at least 5, 10, 15 or 20 wt. % solids (i.e. excluding the liquid aqueous carrier) of the flame-retardant composition. In some embodiments, the concentration of water dispersible derivative is at least 25, 30, 35, 40, 45, 50, 55, 60, 65, 70, 75, 80, 85, 90, or 95 wt. % solids of the flame-retardant composition. In some embodiments, the concentration of water dispersible derivative is no greater than 95, 90, 85, 80, 75, 20, 65, 60, 55, 50, 45, 40, 35, 30, or 25 wt. % solids of the flame-retardant composition.

One method of assessing the effect of the water dispersible derivative of an unsaturated dicarboxylic acid or anhydride thereof is to determine the effect on the overall char yield. Char yield can be characterized using thermogravimetric analysis (TGA) as further described in the examples. The theoretical char yield of bicomponent systems can be calculated from the following equation:

$$\% \text{ Char} = X_1 Y_1 + X_2 Y_2$$

where $X_i$ is the mass fraction of a (e.g. char enhancing) water dispersible derivative component, $Y_i$ is the percent char yield of the water dispersible polymer, $X_2$ is the mass fraction of the water dispersible polymer, and $Y_2$ is the percent char yield of the (e.g. char enhancing) water dispersible derivative component.

The quality of the resulting char can also be characterized. As used herein, a "weak" char is typically an agglomerate of pieces based on a Scanning Electron Microscopy SEM image at a magnification of 10×. Further, a weak char is brittle and easily breaks into powder fragments when manipulated with a low amount of force applied the metal spatula. In contrast a "strong" char is a continuous network based on SEM at a magnification of 10×. Further, a strong char breaks into larger pieces when manipulated with greater force applied to the metal spatula.

Figure 2:
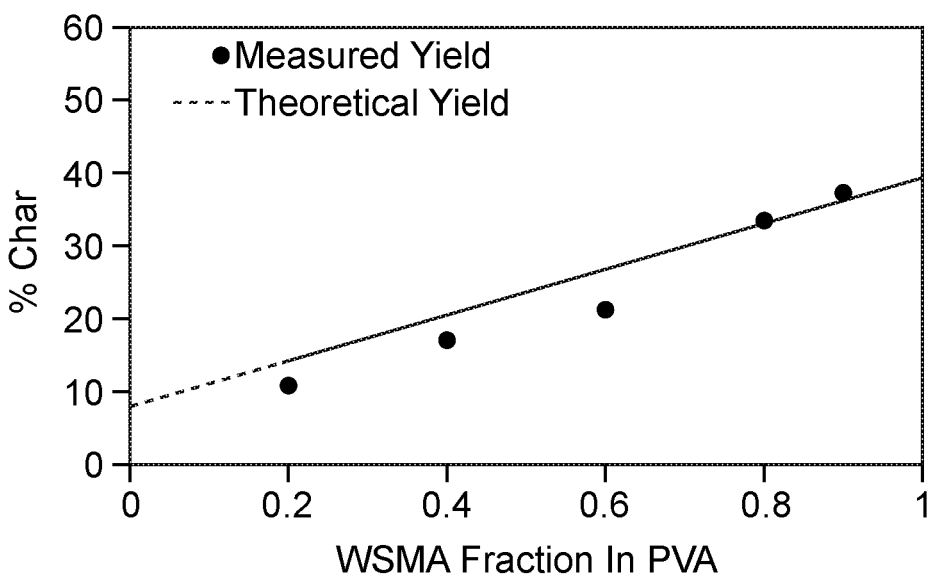
FIG. 2 is the % char of PVA comprising a water dispersible unsaturated dicarboxylic acid derivative.
Figure 3:
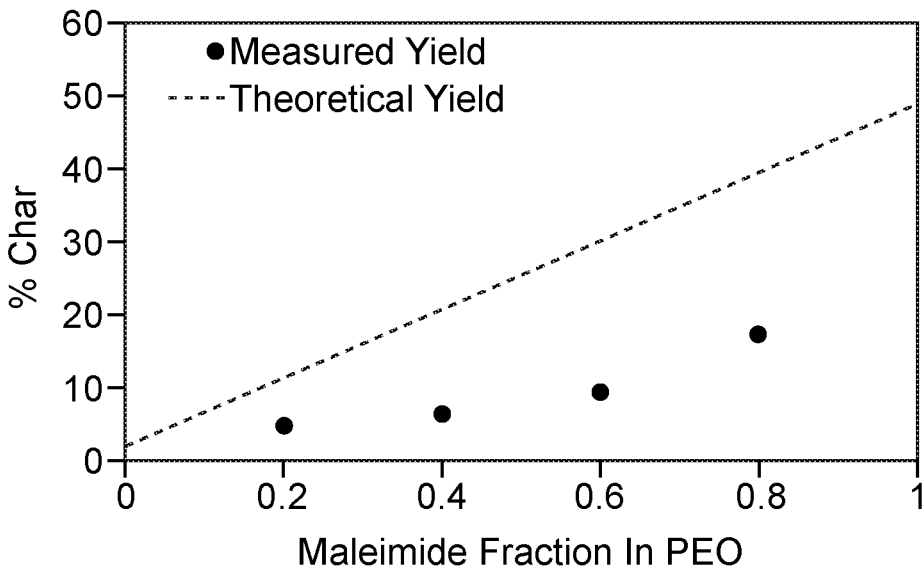
FIG. 3 is the % char of polyethylene oxide (PEO) comprising a comparative maleimide compound.
Figure 4:
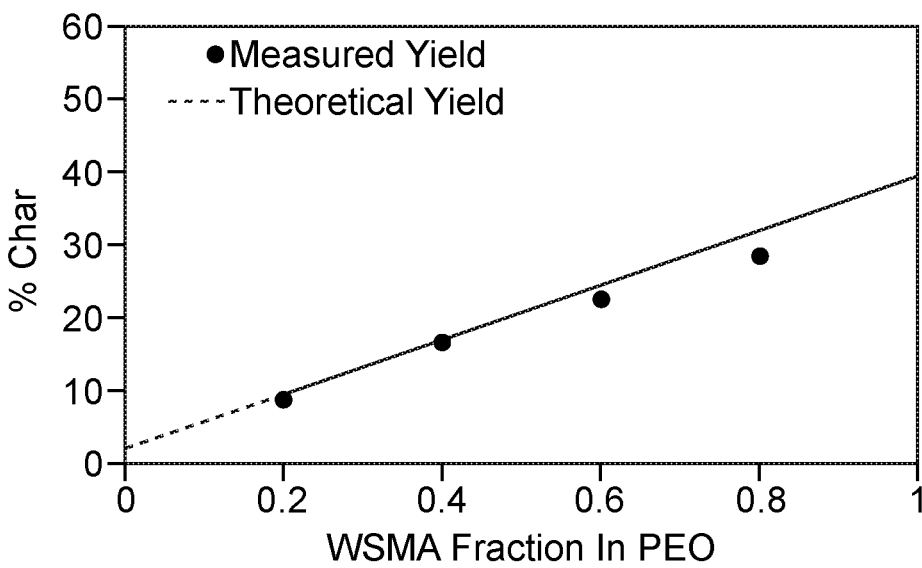
FIG. 4 is the % char of PVA comprising a water dispersible unsaturated dicarboxylic acid derivative.

FIGS. 1-6 show the theoretical yield in comparison to the actual yield of various thermally decomposed mixtures. In each of these graphs the x-axis ranges from 0 (i.e. 100% water dispersible polymer) to 1 (i.e. 100% water dispersible derivative or comparative). Thus, in the case of 100% PVA, the % char is slightly less than 10, as shown in FIGS. 1, 2, 5 and 6. In the case of 100% PEO, the % char is a few percent, as shown in FIGS. 3 and 4. Notably a char of 100% PVA or 100% PEO is a weak char.

FIG. 1 shows the theoretical yield of PVA and a comparative maleimide compound, N,N'-1,3-phenylenedimaleimide. The actual char yield is less than the theoretical yield, surmised to be caused by these materials not forming a homogeneous mixture. The char quality of a mixture of 40 wt. % PVA and 60 wt. % maleimide was weak.

FIG. 2 shows the theoretical yield of PVA and a water dispersible maleic anhydride derivative.

In this embodiment, the actual char yield is improved relative to FIG. 1, yet not greater than the theoretic char yield. Notably, however, the char quality of a mixture of 40 wt. % PVA and 60 wt. % water dispersible maleic anhydride derivative was strong.

FIG. 3 shows the theoretical yield of PEO and a comparative maleimide compound, N,N'-1,3-phenylenedimaleimide. The actual char yield is less than the theoretical yield, surmised to be caused by these materials not forming a homogeneous mixture. The char quality of a mixture of 40 wt. % PEO and 60 wt. % maleimide was weak.

FIG. 4 shows the theoretical yield of PEO and a water dispersible maleic anhydride derivative.

In this embodiment, the actual char yield is improved relative to FIG. 3, yet not greater than the theoretic char yield. Notably, however, the char quality of a mixture of 40 wt. % PEO and 60 wt. % water dispersible maleic anhydride derivative was strong.

Figure 5:
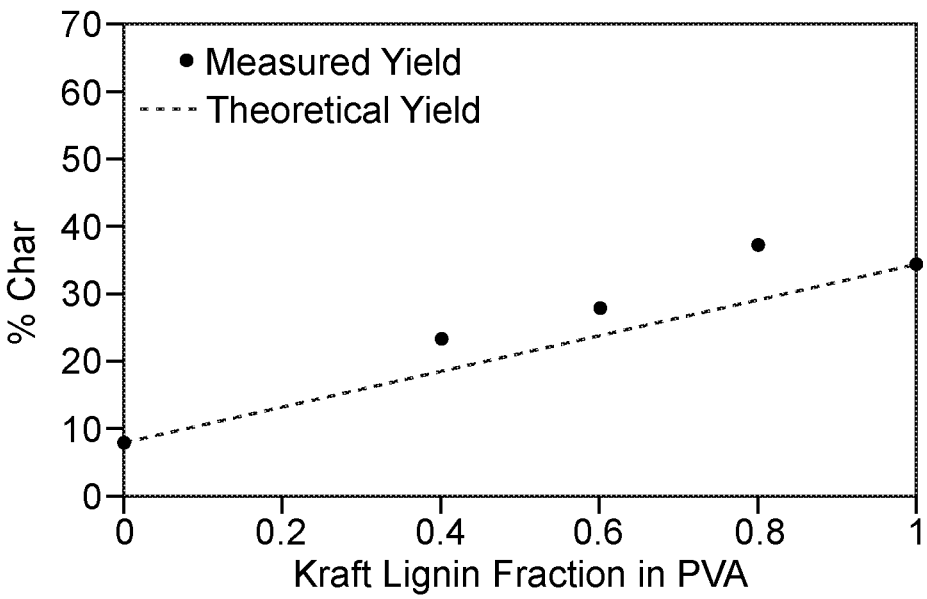
FIG. 5 is the % char of PVA comprising lignin.

FIG. 5 shows the theoretical yield of PVA and a comparative kraft lignin. The actual char yield is similar to the theoretical yield, surmised to be caused by these materials forming a homogeneous mixture. The char quality of a mixture of 40 wt. % PVA and 60 wt. % kraft lignin was weak. Notably the char of 100% kraft lignin is a weak char.

Figure 6:
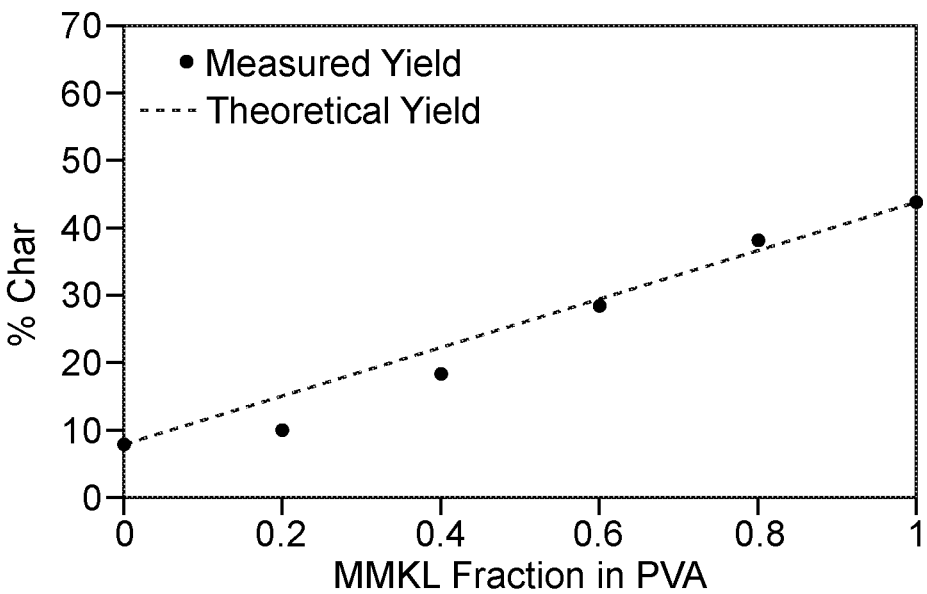
FIG. 6 is the % char of PVA comprising a water dispersible unsaturated dicarboxylic acid/lignin derivative.

FIG. 6 shows the theoretical yield of PVA and a water dispersible maleic anhydride derivative comprising lignin covalently bonded to maleimide moieties. The actual char yield is similar to the theoretical yield, surmised to be caused by these materials forming a homogeneous mixture. The char quality of a mixture of 40 wt. % PVA and 60 wt. % kraft lignin was strong.

In view of the improvement is char strength, the water dispersible derivative of an unsaturated dicarboxylic acid or anhydride thereof is believed to crosslink the char. In order for this reaction mechanism to occur, the water dispersible derivative is surmised to have an onset of thermal decomposition temperature at a higher temperature than the onset of thermal decomposition of the water dispersible polymer.

The water dispersible polymer is combined with the water dispersible derivative of an unsaturated dicarboxylic acid or anhydride thereof at a concentration such that the thermally decomposed char is strong, rather than weak. Provided that the char is sufficiently strong, the concentrations can be selected to minimize cost. For example, kraft lignin is typically less expensive than water dispersible polymers such as PVA or PEO. Thus, when the water dispersible derivative is a reaction product of lignin and an unsaturated dicarboxylic acid or anhydride thereof, the concentration of the water dispersible derivative is typically maximized. Alternatively, when the water dispersible is a compound, the cost of the compound may be greater than water dispersible polymers such as PVA or PEO. Thus, the concentration of water dispersible polymer would typically be maximized.

EXAMPLES

All materials are commercially available, for example from Sigma-Aldrich Chemical Company, Milwaukee, WI, USA, or known to those skilled in the art, unless otherwise stated or apparent.

The following abbreviations are used in this section: mL=milliliters, g=grams, kg=kilograms, lb=pounds, cm=centimeters, mm=millimeters, μm=micrometers, mil=thousandths of an inch, wt %=percent by weight, min=minutes, h=hours, d=days, N=newtons, NMR=nuclear magnetic resonance, ppm=parts per million, eq=equivalent. Abbreviations for materials used in this section, as well as descriptions of the materials, are provided in Table 1.

Materials

TABLE 1

| Material | Details |
|---|---|
| PVA 88 | Polyvinyl alcohol, Supplier: Alfa Aesar CAS 9002-89-5 87-88% Hydrolyzed |
| PEO | Polyethylene oxide, Supplier: Sigma Aldrich. CAS 25322 68 3 Average molecular weight: 400,000 |
| Maleimide | N,N'-1,3-phenylenedimaleimide, Supplier: Tokyo Chemical Co., LTD EC No. 221-112-8 |
| WSMA | Water-soluble maleimide compound, prepared as described in Preparative Example 1 |
| diamino-p-xylene | Liquid, Sigma |
| maleic anhydride | Pellet, Alfa |
| toluene | Liquid, J T Baker |
| MMKL | Maleimide-modified kraft lignin, prepared as described in Preparative Example 2 |
| Kraft | Kraft lignin, Supplier: Sigma Aldrich CAS 8068-05-1 |

TABLE 1-continued

| Material | Details |
|---|---|
| Oxalyl chloride | Sigma Aldrich |
| DMF | Dimethyl formamide, Anhydrous, Sigma Aldrich |
| MDHA | 6-maleimidohexanoic acid, Alfa |
| DCM | Dichloromethane |
| NaOH | 0.1M NaOH, J T Baker |

Preparative Example 1: WSMA

The general procedure for synthesizing WSMA begins by flame drying a 2-necked RBF equipped with a stopper, addition funnel, and magnetic stir bar. Maleic anhydride is added to the round bottom and dissolved in toluene to a final concentration near 10 weight percent. The solution is stirred and heated to 50° C. The diamino-p-xylene is added to the addition funnel in a 1:2 mole ratio with maleic anhydride. The diamino-p-xylene is dripped into the RBF once the maleic anhydride is dissolved. A white crystalline solid will form quickly. At this point, the heat is turned off but the agitation continues for another twelve hours. After 12 hours, the precipitate is isolated by vacuum filtration and washed with cold toluene. The isolated product is vacuum dried for greater than 12 hours. The product was characterized by $D_2O$ H-NMR.

Preparative Example 2: MMKL

The synthesis of MMKL assumed 2 mmol of reactive hydroxyls per gram of kraft lignin. We thus first converted 2 mmol of MDHA into 2 mmol of 6-maleimidohexanoyl chloride per gram kraft lignin. This conversion was completed by dissolving MDHA in DCM at 0° C. To this solution, a stoichometric amount of oxalyl chloride was dripped in via addition funnel. This solution was allowed to react for 4 hours and warm to room temperature. Concurrently, Kraft was dissolved in anhydrous DMF. The solution of 6-maleimidohexanoyl chloride was dripped, as is, into the Kraft solution. This solution stirred overnight and was heated to 50° C. After 12 hours, the solution was poured into an excess of DI water. MMKL remained dispersed in water and was centrifuged. MMKL was obtained as a solid that was vacuum dried overnight.

Preparation of Mixtures for Char Evaluation

The water dispersible unsaturated dicarboxylic acid derivatives (e.g. WSMA or MMKL) and kraft lignin comparative were combined with 10 wt. % aqueous solutions of PVA or PEO at weight fractions of 0.2 (i.e. 20 wt. % solids), 0.4, 0.6, and 0.8 water dispersible derivative (e.g. WSMA or MMKL) or kraft lignin in PVA or PEO. The mixtures were combined in a rolling jar overnight.

The N,N'-1,3-phenylenedimaleimide was first combined with 0.1 N NaOH and then combined with 10 wt. % aqueous solutions of PVA or PEO at weight fractions of 0.2 (i.e. 20 wt. % solids), 0.4, 0.6 and 0.8 N,N'-1,3-phenylenedimaleimide in PVA or PEO. The mixture was combined in a rolling jar overnight.

Characterization Methods

Solubility 0.25 gm of WSMA was added to 10 mL 0.1 N NaOH (ambient temperature of 25° C.) and the WSMA dissolved readily. By comparison, 0.25 gm of maleimide was added to a 10 mL of 0.1 N NaOH and the maleimide initially appeared to disperse but settled out within 5 minutes.

Char Yield

The char yield was characterized using thermogravimetric analysis (TGA). The analysis was characterized in a nitrogen environment, which better imitates the anaerobic conditions that form around a flame. For the analysis, samples were dried at 120° C., then cooled, then heated at a ramp rate of 10° C. to final temperature of 600° C. The percent char yield was calculated from the final weight of the remaining mass after heating relative to the initial mass of the sample after the drying step.

Char Quality

The char quality was evaluated with Scanning Electron Microscopy images (magnification 10×) of the sample after charring in the TGA and by manipulating the char with a metal spatula by hand. The Char Quality was characterized as "weak" or "strong", as previously described.

TABLE 2

| Example | CE-1 | EX-1 | CE-2 | EX-2 | CE-3 | EX-3 |
|---|---|---|---|---|---|---|
| PVA 88 (wt %) | 40 | 40 | | | 40 | 40 |
| PEO (wt %) | | | 40 | 40 | | |
| Maleimide (wt %) | 60 | | 60 | | | |
| WSMA (wt %) | | 60 | | 60 | | |
| Kraft (wt %) | | | | | 60 | |
| MMKL (wt %) | | | | | | 60 |
| Char Yield (% of theorertical) | 12% (60%) | 19% (95%) | 10% (50%) | 20% (100) | 25% (125%) | 28% (100%) |
| Char Strength | Weak | Strong | Weak | Strong | Weak | Strong |

Various other mixtures of the maleimide, kraft lignin, WSMA and MMKL combined with PVA or PEO were prepared as described above. The theoretical char yield was calculated as described above. The theoretical char yield was plotted in comparison to the actual char yield as depicted in FIGS. 1-6. The char quality tendencies were the same as described in Table 2 for mixtures containing 0.4 and 0.8 fraction of water dispersible unsaturated dicarboxylic acid (e.g. maleic anhydride) derivative.

What is claimed is:

1. A flame-retardant composition comprising:
a mixture of
a water dispersible organic polymer; and
a water dispersible derivative
having the general formula

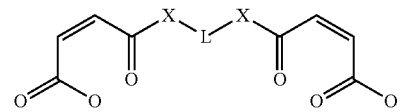

wherein X is oxygen or nitrogen; and
L is a divalent linking group comprising an aromatic moiety.

2. The flame-retardant composition of claim 1 wherein the water dispersible derivative has a solubility in a 0.1 N aqueous solution of NaOH at 25° C. of at least 25 g/liter.

3. The flame-retardant composition of claim 1 wherein the water dispersible organic polymer has an onset of thermal decomposition in air at a temperature range of 200° C. to 250° C.

4. The flame-retardant composition of claim 1 wherein the water dispersible organic polymer comprises PVA, PEO, or a mixture thereof.

5. The flame-retardant composition of claim 1 wherein the water dispersible organic polymer has a hydroxyl to carbon ratio of at least 1:5.

6. The flame-retardant composition of claim 1 wherein the water dispersible organic polymer forms conjugated dienes during thermal decomposition.

7. The flame-retardant composition of claim 1 wherein the water dispersible derivative has an onset of thermal decomposition temperature greater than the onset of thermal degradation temperature of the water dispersible polymer.

8. The flame-retardant composition of claim 1 wherein upon thermal decomposition of the mixture of water dispersible polymer and water dispersible derivative a char forms and the char yield is 90% or greater of the theoretical char yield.

9. The flame-retardant composition of claim 1 wherein upon thermal decomposition of the mixture of water dispersible polymer and water dispersible derivative a chars forms of increased strength in comparison to the water dispersible polymer alone.

10. A flame-retardant composition comprising the composition of claim 1 dispersed in an aqueous carrier.

11. A method of making a flame-retardant composition comprising dispersing the composition of claim 1 in an aqueous carrier.

* * * * *